US009361824B2

(12) United States Patent
Hsieh

(10) Patent No.: US 9,361,824 B2
(45) Date of Patent: Jun. 7, 2016

(54) GRAPHICS DISPLAY SYSTEMS AND METHODS

(75) Inventor: Ping-Huei Hsieh, Taipei (TW)

(73) Assignee: VIA TECHNOLOGIES, INC., Hsin-Tien, Taipei (TW)

( * ) Notice: Subject to any disclaimer, the term of this patent is extended or adjusted under 35 U.S.C. 154(b) by 577 days.

(21) Appl. No.: 12/980,249

(22) Filed: Dec. 28, 2010

(65) Prior Publication Data

US 2011/0221757 A1 Sep. 15, 2011

Related U.S. Application Data

(60) Provisional application No. 61/313,135, filed on Mar. 12, 2010.

(30) Foreign Application Priority Data

Nov. 5, 2010 (TW) ................................ 99138085 A

(51) Int. Cl.
*G06F 13/14* (2006.01)
*G09G 3/20* (2006.01)

(52) U.S. Cl.
CPC ........ *G09G 3/2096* (2013.01); *G09G 2330/022* (2013.01); *G09G 2340/16* (2013.01); *G09G 2370/047* (2013.01)

(58) Field of Classification Search
USPC .......................................................... 345/502
See application file for complete search history.

(56) References Cited

U.S. PATENT DOCUMENTS 5,835,102 A * 11/1998 Monroe et al. ................ 345/545
6,040,843 A * 3/2000 Monroe et al. ................ 345/530
7,202,843 B2 * 4/2007 Shen et al. ...................... 345/87
7,346,006 B2 * 3/2008 Inoue et al. .................... 370/252
7,698,579 B2 * 4/2010 Hendry et al. ................ 713/300
7,961,163 B2 * 6/2011 Koo et al. ........................ 345/87
8,175,146 B2 * 5/2012 Nam et al. ............... 375/240.01
8,208,051 B2 * 6/2012 Kitani .................... H04N 5/335 348/294
2003/0128198 A1 * 7/2003 Mizuyabu et al. ............ 345/204
2003/0156551 A1 8/2003 Inoue et al.
2004/0145596 A1 * 7/2004 Yamakawa et al. ........... 345/690
2005/0253793 A1 * 11/2005 Chien et al. ...................... 345/87
2006/0125812 A1 * 6/2006 Lee .............................. 345/204
2007/0128899 A1 * 6/2007 Mayer ........................... 439/152
2007/0153007 A1 * 7/2007 Booth .................... G09G 5/003 345/501
2007/0206018 A1 * 9/2007 Bajic et al. .................... 345/501
2008/0001934 A1 * 1/2008 Wyatt ................... G09G 3/3618 345/204
2008/0024473 A1 * 1/2008 Hsu et al. ...................... 345/204
2008/0034238 A1 2/2008 Hendry et al.
2008/0088611 A1 * 4/2008 Yeon ............................ 345/204
2008/0158234 A1 * 7/2008 Kim .............................. 345/501
2008/0177994 A1 * 7/2008 Mayer ............................... 713/2
2008/0222446 A1 * 9/2008 Yasaki et al. ...................... 714/1

(Continued)

*Primary Examiner* — Jacinta M Crawford
(74) *Attorney, Agent, or Firm* — McClure, Qualey & Rodack, LLP

(57) ABSTRACT

A graphics display system is provided with a graphics processing module and a display module. The graphics processing module detects whether first frame data is equal to second frame data subsequent to the first frame data, and in response to the first frame data being equal to the second frame data, stops outputting any frame data after outputting the second frame data and a mode switching command. The display module displays graphic images according to the first frame data, and stores the second frame data as temporary data and continuingly displays the graphic images according to the temporary data in response to the mode switching command.

13 Claims, 5 Drawing Sheets

(56) References Cited

U.S. PATENT DOCUMENTS

| | | | | |
|---|---|---|---|---|
| 2009/0002292 | A1* | 1/2009 | Koo et al. | 345/87 |
| 2009/0009644 | A1 | 1/2009 | Kitani | |
| 2009/0213033 | A1* | 8/2009 | Chen | 345/1.1 |
| 2010/0238104 | A1* | 9/2010 | Liao et al. | 345/99 |
| 2010/0271289 | A1* | 10/2010 | Goodart | G09G 5/006 345/3.1 |
| 2010/0281277 | A1* | 11/2010 | Qin et al. | 713/300 |
| 2010/0315427 | A1* | 12/2010 | Wyatt et al. | 345/502 |
| 2011/0157202 | A1* | 6/2011 | Kwa | G09G 5/395 345/547 |

* cited by examiner

GRAPHICS DISPLAY SYSTEMS AND METHODS

CROSS REFERENCE TO RELATED APPLICATIONS

This application claims the benefit of U.S. Provisional Application No. 61/313,135, filed on Mar. 12, 2010, the entirety of which is incorporated by reference herein. This Application also claims priority of Taiwan Patent Application No. 99138085, filed on Nov. 5, 2010, the entirety of which is incorporated by reference herein.

BACKGROUND OF THE INVENTION

1. Field of the Invention

The invention generally relates to graphics display and control technologies, and more particularly, to graphics display systems and methods for managing an operation mode of graphics displays to save system resources and power.

2. Description of the Related Art

For most electronic devices, such as desktop computers, laptop computers, or workstations, display devices (or so-called monitors) coupled thereto or built therein are required as basic human-machine interfaces (MMI) and/or for multimedia applications. Generally, an electronic device uses a graphic card, a video card, or a video adapter to process graphics data and further drives a display device to display graphic images for providing interaction with users.

FIG. 1 is a block diagram illustrating a conventional display architecture of an electronic device. In the electronic device 100, a central control unit 110 is provided with a display card 120. The display card 120 is coupled to a display device 130 via interfaces of the Low-Voltage Differential Signaling (LVDS) architecture. The interfaces include a data bus 10 and a Display Data Channel (DDC) bus 20, wherein the data bus 10 is used for delivering frame data and the DDC bus 20 is used for the display card 120 to retrieve the information and settings of the display device 130. For optimizing the performance of the display device 130, the display card 120 may adjust parameters, e.g. brightness, contrast, and chroma, etc., of the display device 130, and/or initialize or demagnetize the display device 130 via the DDC bus 20. The DDC bus 20 may further include a Serial DAta (SDA) line 21 and a Serial Clock (SCL) line 22, wherein the SDA line 21 is used for delivering internal data, such as brand name, serial number, and supported resolutions, etc., of the display device 130 and the SCL line 22 is used for delivering synchronous clock pulses for the data delivery on the SDA line 21.

In the cases where the user temporarily leaves the desk where an electronic device is placed or the user temporarily performs other tasks not involving the electronic device, the operation mode of the electronic device is switched to an idle mode and the graphic images outputted by the display device 130 remains unchanged. However, the display card 120 still continues to output the same frame data to the display device 130. Consequently, unnecessary system resources are occupied and power is consumed for the continuing display of the unchanged graphic images, including the operation of the display card 120 and data delivery on the data bus 10 and the DDC bus 20.

BRIEF SUMMARY OF THE INVENTION

Accordingly, embodiments of the invention provide graphics display systems and methods. In one aspect of the invention, a graphics display system including a graphics processing module and a display module is provided. The graphics processing module detects whether first frame data is the same as second frame data subsequent to the first frame data, and in response to the first frame data being the same as the second frame data, stops outputting any frame data after outputting the second frame data and a mode switching command. The display module displays graphic images according to the first frame data, and stores the second frame data as temporary data and continuingly displays the graphic images according to the temporary data in response to the mode switching command.

In another aspect of the invention, another graphics display system is provided with a graphics processing module and a display module. The graphics processing module detects whether first frame data is the same as second frame data subsequent to the first frame data in a predetermined time period, and in response to the first frame data being the same as the second frame data, stops outputting any frame data after outputting the second frame data and a mode switching command. The display module displays at least one graphic image according to the first frame data, and stores the second frame data as temporary data and continuingly displays the at least one graphic image according to the temporary data in response to the mode switching command.

In another aspect of the invention, another graphics display method for a graphics display system including a display module and a graphics processing module is provided. The graphics display method includes the steps of displaying, by a display module, graphic images according to first graphic data received from the graphics processing module, detecting, by the graphics processing module, whether a plurality of second frame data subsequent to the first frame data in a predetermined time period are all the same as the first frame data, outputting, by the graphics processing module, the second frame data and a mode switching command to stop the display module from displaying the graphic images, in response to all of the plurality of second frame data being the same as the first frame data, storing, by the display module, the second frame data as temporary data in response to the mode switching command, and enabling the display module to continuing display the graphic images according to the temporary data.

Other aspects and features of the present invention will become apparent to those with ordinarily skill in the art upon review of the following descriptions of specific embodiments of the graphics display systems and methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
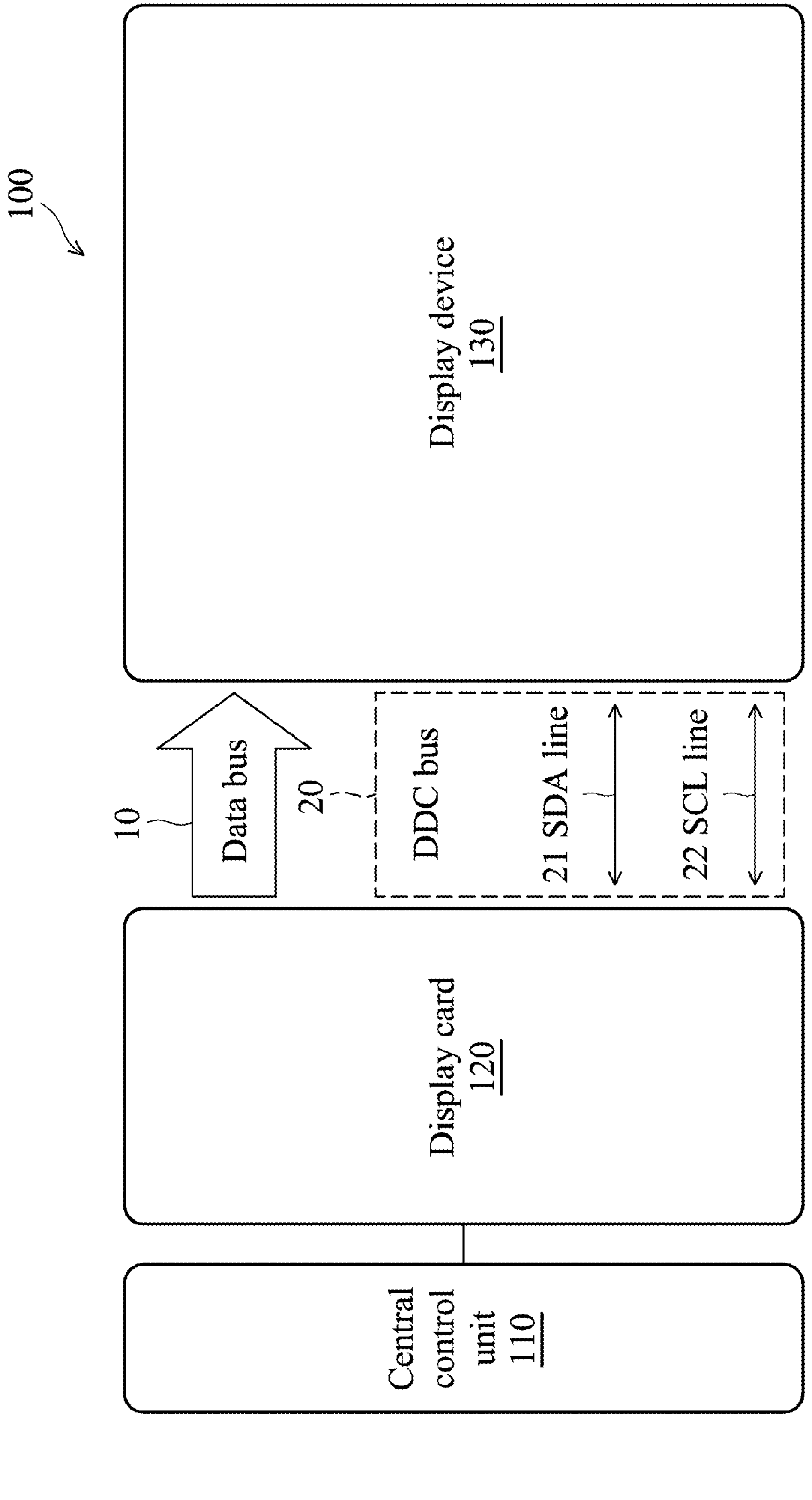
FIG. 1 is a block diagram illustrating a conventional display architecture of an electronic device.
Figure 2:
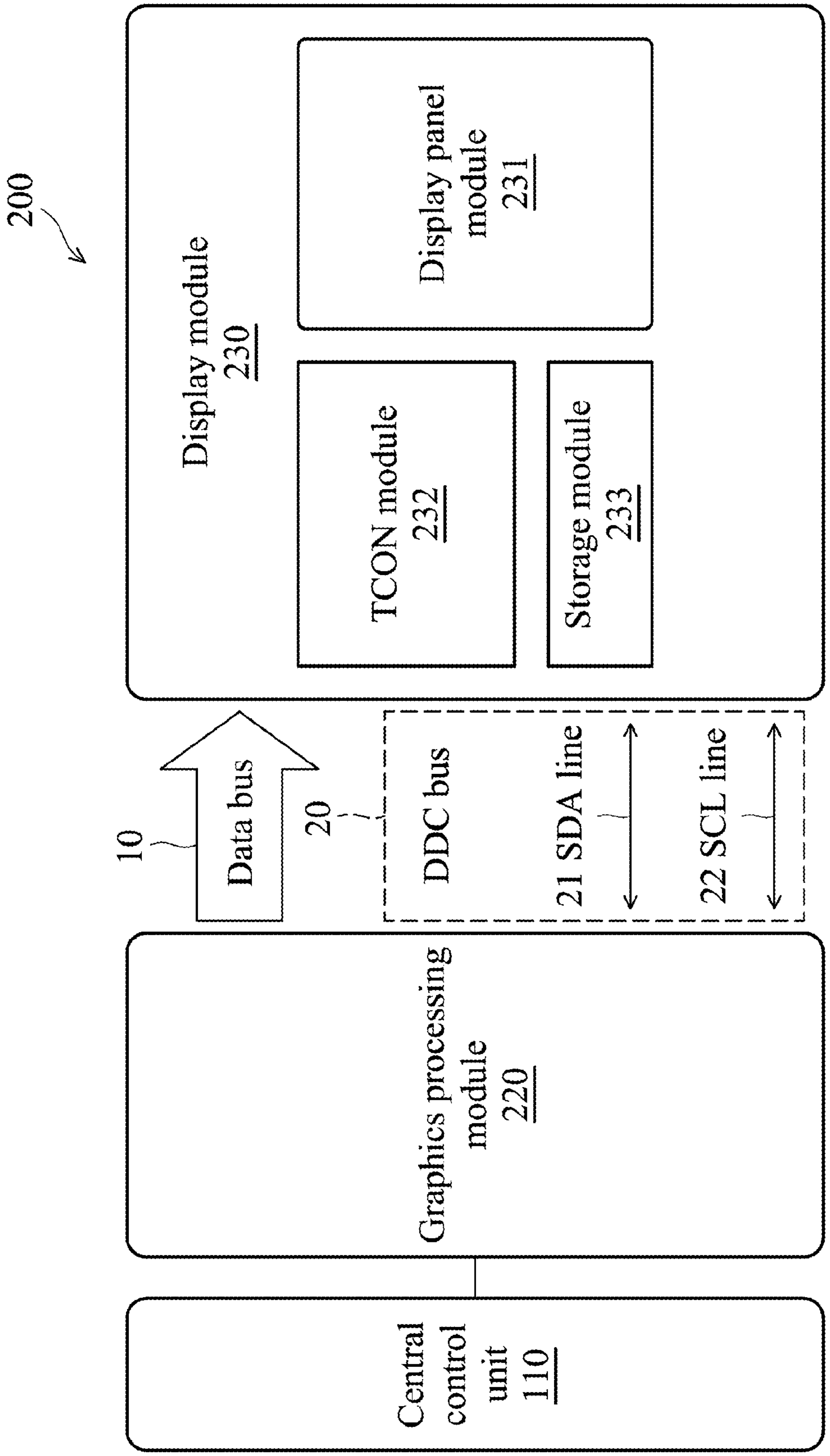
FIG. 2 is a block diagram of a graphics display system according to an embodiment of the invention.

FIG. 2 is a block diagram of a graphics display system according to an embodiment of the invention. Note that the same numbering in FIGS. 1 and 2 denotes the same component as described above with respect to FIG. 1, while different numbering in FIG. 2 describes different components. The graphics display system 200 includes a central control unit 110 and a graphics processing module 220, wherein the graphics processing module 220 is further coupled to a display module 230 via the interfaces of the LVDS architecture. The display module 230 includes a display panel module 231, a Timing Controller (TCON) module 232, and a storage module 233. The TCON 232 synchronously processes the clock signals for the display panel module 231 and outputs control signals to drive the display panel module 231. The interfaces of the LVDS architecture include a data bus 10 and a DDC bus 20. The data bus 10 is used for delivering frame data, and the DDC bus 20 is used for the graphics processing module 220 to retrieve the information and settings of the display module 230. For optimizing the performance of the display module 230, the graphics processing module 220 may adjust parameters (e.g. brightness, contrast, and chroma, etc) of the display module 230, and/or initialize or demagnetize the display module 230 via the DDC bus 20. The DDC bus 20 may further include a Serial DAta (SDA) line 21 and a Serial Clock (SCL) line 22, wherein the SDA line 21 is used for delivering internal data, such as brand name, serial number, and supported resolutions, etc., of the display module 230 and the SCL line 22 is used for delivering synchronous clock pulses for the data delivery on the SDA line 21.

Unlike the conventional display architecture, the embodiment as shown in FIG. 2 features the graphics processing module 220, after outputting the first frame data to the display module 230, detecting whether a frame update is required for subsequent frame data. That is, the graphics processing module 220 detects whether the second frame data subsequent to the first frame data is the same as the first frame data. If the second frame data is the same as the first frame data, it is determined that the user is not operating the graphics display system 200. Thus, the graphics processing module 220 outputs a mode switching command to the TCON module 232 in the display module 230 via the SDA line 21, to instruct the display module 230 to enter the power-saving mode from the normal mode. In another embodiment, the graphics processing module 220 may continuingly detect whether a plurality of second frame data subsequent to the first frame data in a predetermined time period are all the same as the first frame data. If so, the graphics processing module 220 outputs the mode switching command to the TCON module 232 in the display module 230 via the SDA line 21, to instruct the display module 230 to enter the power-saving mode from the normal mode. In this way, frequent switching between the normal mode and the power-saving mode of the display module 230 may be avoided.

Next, the graphics processing module 220 outputs the second frame data to the display module 230 via the data bus 10 and then stops outputting any frame data. Meanwhile, in one embodiment, the graphics display system 200 may turn off a part of the power supply to the graphics processing module 220, so that the graphics processing module 220 may enter an idle mode or a sleep mode. The mode switching command may be a predetermined instruction, such as a READ or WRITE instruction specifying a slave address, or a special instruction customized for the mode switching of the graphics processing module 220.

When receiving the mode switching command, the TCON module 232 in the display module 230 enters the power-saving mode and then stores the second frame data received via the data bus 10 in the storage module 233 as temporary data. The TCON module 232 further controls the display panel module 231 to continuingly display graphic images according to the temporary data stored in the storage module 233 instead of the frame data received via the data bus 10. Since only one copy of frame data is required to be stored as temporary data, the size of the storage module 233 may be determined according to the current resolution of the display panel module 231. The storage module 233 may be any storage medium, such as a read-only memory, a flash memory, a non-volatile memory (e.g., a hard-disk), or a volatile memory (e.g., a Random Access Memory (RAM), or a cache memory).

In addition, after the display module 230 has entered the power-saving mode, the TCON module 232 continuingly outputs the current vertical blank status of the display panel module 231 to the graphics processing module 220 via the SCL line 22. It is noted that, although the outputting of frame data is stopped in the idle mode or sleep mode, the graphics processing module 220 still continues to detect for subsequent frame data. When a frame update for the subsequent frame data is detected, i.e., a third frame data subsequent to the second frame data is detected as not being the same as the second frame data, the graphics processing module 220 leaves the idle mode or sleep mode and determines a synchronous time for the display module 230 according to the current vertical blank status received via the SCL line 22. The graphics processing module 220 further outputs the third frame data to the display module 230 via the data bus 10 at the synchronous time. On the other hand, when the display module 230 is in the power-saving mode, the TCON module 232 continuingly detects whether new frame data is received via the data bus 10. Thus, when the TCON module 232 detects that the third frame data has been received via the data bus 10, the display module 230 leaves the power-saving mode and the TCON module 232 instructs the display panel module 231 to display graphic images according to the third frame data instead of the temporary data stored in the storage module 233. In other words, the temporary data stored in the storage module 233 is no longer used for displaying graphic images when the display module 230 leaves the power-saving mode.

In another embodiment, when the graphics processing module 220 detects that the third frame data subsequent to the second frame data is not the same as the second frame data, the graphics processing module 220 leaves the idle mode or sleep mode and determines a synchronous time for the display module 230 according to the current vertical blank status received via the SCL line 22. After that, the graphics processing module 220 further changes the voltage level on the SDA line 21, to instruct the display module 230 to leave the power-saving mode. Then, the graphics processing module 220 outputs the third frame data to the display module 230 via the data bus 10. In response to detecting the change of the voltage level on the SDA line 21, the display module 230 leaves the power-saving mode and displays graphic images according to the third frame data instead of the temporary data stored in the storage module 233.

Figure 3:
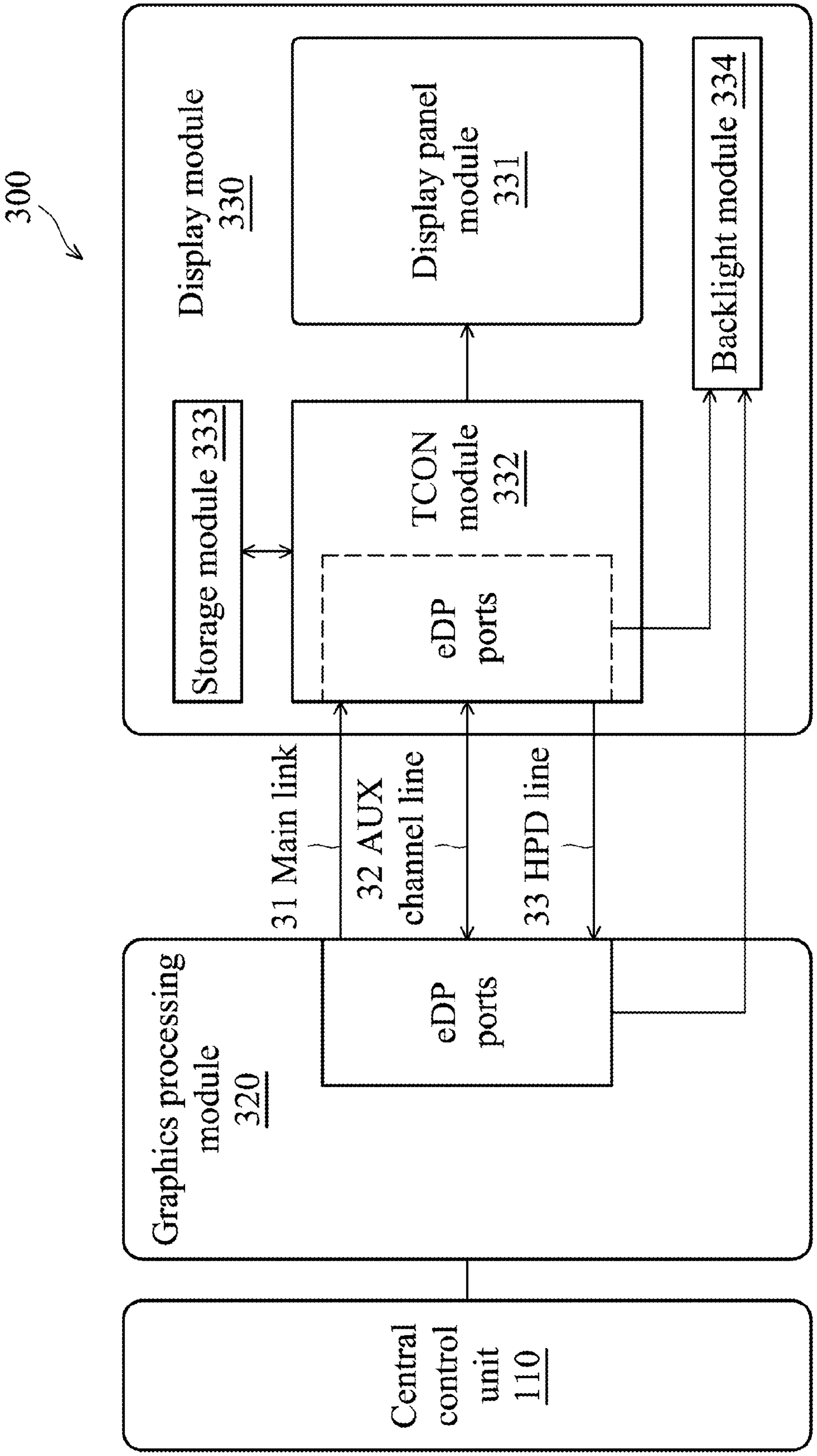
FIG. 3 is a block diagram of a graphics display system according to another embodiment of the invention.

FIG. 3 is a block diagram of a graphics display system according to another embodiment of the invention. Note that the same numbering in FIGS. 1 and 3 denotes the same component as described above with respect to FIG. 1, while different numbering in FIG. 3 describes different components. The graphics display system 300 includes a central control unit 110 and a graphics processing module 320, wherein the graphics processing module 320 is further coupled to a display module 330 via the interfaces of the embedded DisplayPort (eDP) architecture. The display module 330 includes a display panel module 331, a Timing Controller (TCON) module 332, a storage module 333, and a backlight module 334. The TCON 332 synchronously processes the clock signals for the display panel module 331 and outputs control signals to drive the display panel module 331 and the backlight module 334. The interfaces of the eDP architecture include a main link 31, an Auxiliary (AUX) channel line 32, and a Hot Plug Detect (HPD) line 33. The main link 31 is used for delivering frame data, the AUX channel line 32 is used for the graphics processing module 320 to manage and control the settings of the display module 330, and the HPD line 33 is used for detecting the plugging in-between the graphics processing module 320 and the display module 330 and for delivering vertical blank statuses.

In this embodiment, the graphics processing module 320 instructs the display module 330 to enter the power-saving mode via the AUX channel line 32. To further clarify, after outputting the first frame data to the display module 330, the graphics processing module 320 detects whether a frame update is required for the subsequent frame data. That is, the graphics processing module 320 detects whether the second frame data subsequent to the first frame data is the same as the first frame data. If the second frame data is the same as the first frame data, it is determined that the user is not operating the graphics display system 300. Thus, the graphics processing module 320 outputs a mode switching command to the TCON module 332 in the display module 330 via the AUX channel line 32, to instruct the display module 330 to enter the power-saving mode from the normal mode. In another embodiment, after outputting the first frame data to the display module 330, the graphics processing module 320 may continuingly detect whether a plurality of second frame data subsequent to the first frame data in a predetermined time period are all the same as the first frame data. If so, the graphics processing module 320 outputs the mode switching command to the TCON module 332 in the display module 330 via the AUX channel line 32, to instruct the display module 330 to enter the power-saving mode from the normal mode. In this way, frequent switching between the normal mode and the power-saving mode of the display module 330 may be avoided.

Next, the graphics processing module 320 outputs the second frame data to the display module 330 via the main link 31 and then stops outputting any frame data to the display module 330. Meanwhile, in one embodiment, the graphics display system 300 may turn off a part of the power supply to the graphics processing module 320, so that the graphics processing module 320 may enter an idle mode or a sleep mode. The mode switching command may be a predetermined instruction, such as a READ or WRITE instruction specifying a slave address, or a special instruction customized for the mode switching of the graphics processing module 320.

After receiving the mode switching command from the graphics processing module 320, the TCON module 332 in the display module 330 enters the power-saving mode and stores the second frame data received via the main link 31 in the storage module 333 as temporary data. The TCON module 332 further controls the display panel module 331 to display graphic images according to the temporary data instead of the frame data received via the main link 31. Since only one copy of frame data is required to be stored as temporary data, the size of the storage module 333 may be determined according to the current resolution of the display panel module 331. The storage module 333 may be any storage medium, such as a read-only memory, a flash memory, a non-volatile memory (e.g., a hard-disk), or a volatile memory (e.g., a RAM, or a cache memory).

In addition, after the display module 330 has entered the power-saving mode, the TCON module 332 continuingly outputs the current vertical blank status of the display panel module 331 to the graphics processing module 320 via the HPD line 33. It is noted that, although the outputting of frame data is stopped in the idle mode or sleep mode, the graphics processing module 320 still continues to detect for subsequent frame data. When a frame update for the subsequent frame data is detected, i.e., a third frame data subsequent to the second frame data is detected as not being the same as the second frame data, the graphics processing module 320 leaves the idle mode or sleep mode and determines a synchronization time for the display module 330 according to the current vertical blank status received via the HPD line 33. The graphics processing module 320 further outputs the third frame data to the display module 330 via the main link 31 at the synchronization time. On the other hand, when the display module 330 is in the power-saving mode, the TCON module 332 continuingly detects whether new frame data is received via the main link 31. Thus, when the TCON module 332 detects that the third frame data has been received via the main link 31, the display module 330 leaves the power-saving mode and the TCON module 332 instructs the display panel module 331 to display graphic images according to the third frame data instead of the temporary data stored in the storage module 333.

Figure 4:
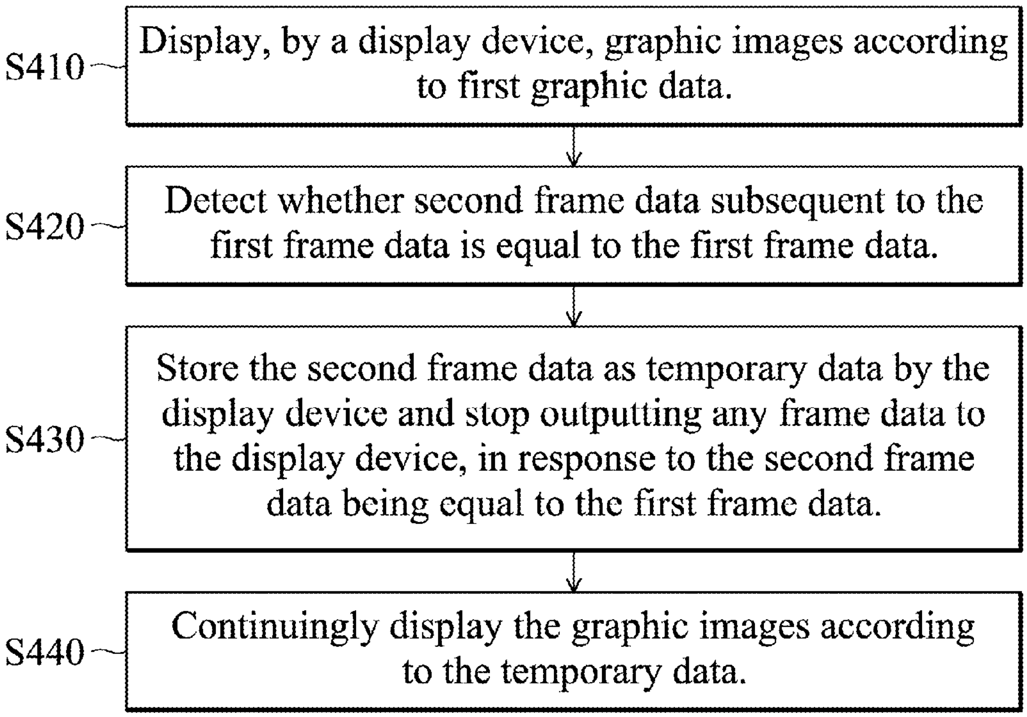
FIG. 4 is a flow chart of a graphics display method according to an embodiment of the invention.

FIG. 4 is a flow chart of a graphics display method according to an embodiment of the invention. In this embodiment, the graphics display method of the invention is applied for efficiently controlling output of frame data to a display device to save system resources, and for managing the display device to display graphic images according to temporary data in a power-saving mode. To begin, graphic images are displayed according to the first frame data by the display device (step S410). The display device may be the display module 230 in FIG. 2 or the display module 330 in FIG. 3, and the frame data may be generated by the graphics processing module 220 in FIG. 2 or the graphics processing module 320 in FIG. 3. After displaying graphic images according to the first frame data, it is determined whether the second frame data subsequent to the first frame data is the same as the first frame data (step S420). If so, it means that the user is not operating the graphics display system in which the graphics display method is applied, and thus, no frame update is required. In response to the second frame data being the same as the first frame data, the second frame data is stored as temporary data by the display device and the outputting of frame data to the display device is stopped (step S430). Lastly, the display device is instructed to continuingly display the graphic images according to the temporary data (step S440). In this way, the display device and the graphics display system have been configured to enter the power-saving mode.

Figure 5:
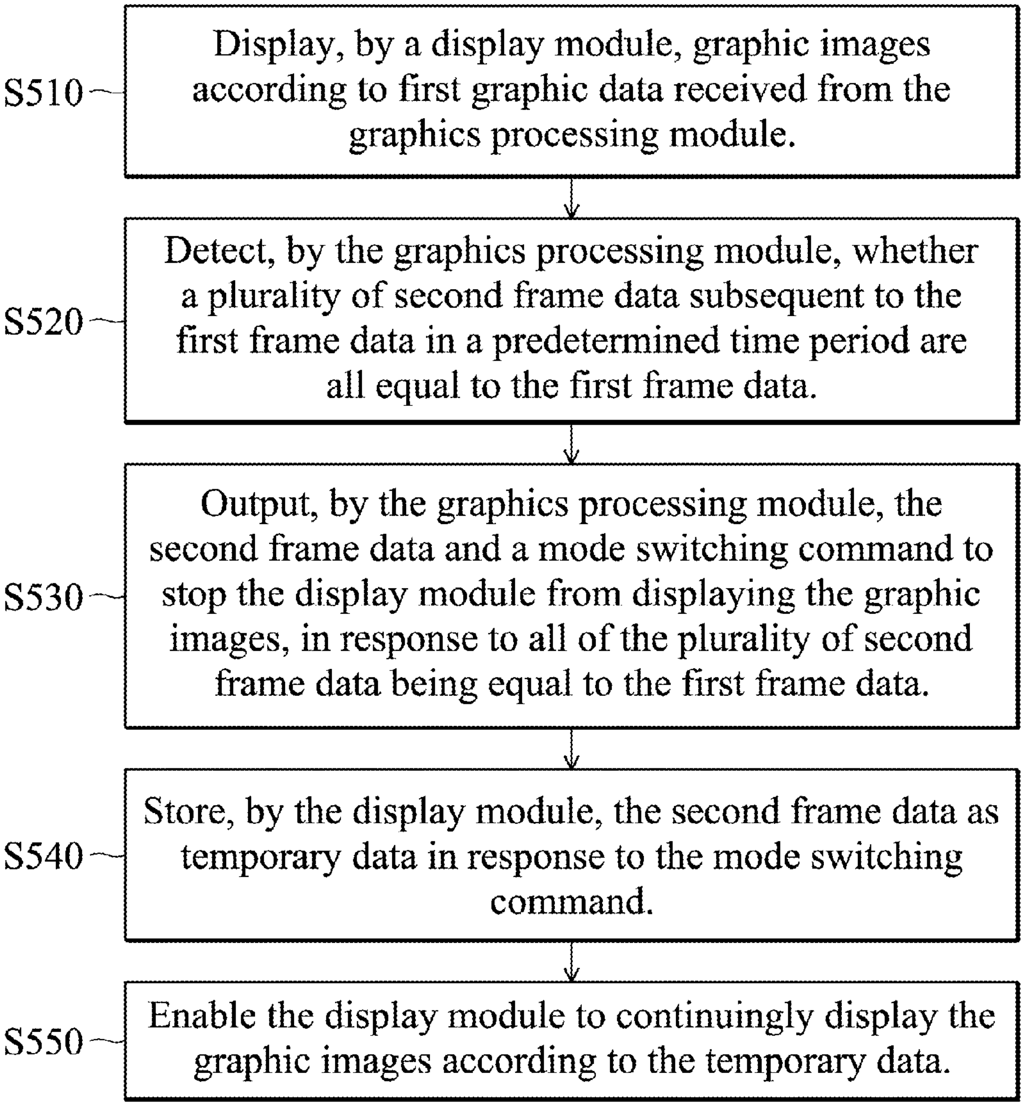
FIG. 5 is a flow chart of a graphics display method according to another embodiment of the invention.

FIG. 5 is a flow chart of a graphics display method according to another embodiment of the invention. In this embodiment, the graphics display method is applicable to a graphics display system including a display module and a graphics processing module, such as the graphics display system 200 in FIG. 2 or the graphics display system 300 in FIG. 3. To begin, the display module displays graphic images according to the first frame data received from the graphics processing module (step S510). The display module may refer to the display module 230 in FIG. 2 or the display module 330 in FIG. 3, and the graphics processing module may refer to the graphics processing module 220 in FIG. 2 or the graphics processing module 320 in FIG. 3. After outputting the first frame data, the graphics processing module continuingly detects whether a plurality of second frame data subsequent to the first frame data in a predetermined time period are all the same as the first frame data (step S520). If so, it means that the user is not operating the graphics display system, and thus, no frame update is required. In response to all of the plurality of the second frame data being the same as the first frame data, the graphics processing module outputs a mode switching command and the second frame data to the display module, and then stops outputting any frame data (step S530). In one embodiment, the communications between the graphics processing module and the display module are performed via the interfaces of the LVDS architecture. Specifically, the mode switching command may be delivered via the SDA line and vertical blank statuses may be delivered from the display module to the graphics processing module via the SCL line. In another embodiment, the communications between the graphics processing module and the display module are performed via the interfaces of the eDP architecture. Specifically, the mode switching command may be delivered via the AUX channel line and vertical blank statuses may be delivered from the display module to the graphics processing module via the HPD line.

Lastly, when receiving the mode switching command, the display module stores one of the plurality of the second frame data as temporary data (step S540), and then continuingly displays graphic images according to the temporary data (step S550). In this way, the graphics display system has been configured to enter the power-saving mode. In the power-saving mode, the graphics processing module is idle (or "asleep") and does not output frame data, so that system resources and power consumption may be efficiently reduced. Meanwhile, the source frame data for the displaying of graphic images by the display module is configured to the temporary data, so that the displaying of graphic images is not hindered by the graphics processing module stopping the output of the frame data.

In addition to configuring the graphics display system to enter the power-saving mode, the graphics display method may further provide ways of recovering from the power-saving mode. In one example, when in the power-saving mode, the display module continuingly outputs its current vertical blank status to the graphics processing module, and at the same time, the graphics processing module continuingly detects whether a frame update for the third frame data subsequent to the second frame data is required. That is, a frame update is required if the graphics processing module detects that the third frame data is not the same as the second frame data. In response to the third frame data not being the same as the second frame data, the graphics processing module determines a synchronization time for the display module according to the vertical blank status. The graphics processing module further outputs the third frame data to the display module at the synchronization time, to instruct the display module to leave the power-saving mode. Upon being instructed to leave the power-saving mode, the display module displays graphic images according to the third frame data instead of the temporary data. Alternatively, if the communications between the graphics processing module and the display module are performed via the interfaces of the LVDS architecture, the graphics processing module may change the voltage level on the SDA line of the LVDS architecture to instruct the display module to leave the power-saving mode and then output the third frame data to the display module. When detecting the change of the voltage level on the SDA line, the display module displays graphic images according to the third frame data instead of the temporary data.

Note that the graphics display methods described above with respect to FIGS. 4 and 5 may be realized by software, firmware, hardware, or any combination thereof. The hardware may be any electronic device with graphics display capability, such as a personal computer, a workstation, a laptop computer, a Personal Digital Assistant (PDA), a cellular phone, or others. The software may be a series of program code or instructions stored in a system memory or any removable/non-removable/volatile/non-volatile machine-readable storage medium, including magnetic storage mediums, optical storage mediums, flash memory cards, digital magnetic tapes, a solid-state RAM, and a solid-state ROM, etc.

While the invention has been described by way of example and in terms of preferred embodiment, it is to be understood that the invention is not limited thereto. Those who are skilled in this technology can still make various alterations and modifications without departing from the scope and spirit of this invention. For example, the central control unit 110, and the graphics processing module 220 or the display module 230, may be incorporated into a graphics display subsystem; the graphics processing module 220 and the display module 230 may be incorporated into one single electronic device or may be installed in separate electronic devices. Likewise, the central control unit 110, and the graphics processing module 320 or the display module 330, may be incorporated into a graphics display subsystem; the graphics processing module 320 and the display module 330 may be incorporated into one single electronic device or may be installed in separate electronic devices. Therefore, the scope of the present invention shall be defined and protected by the following claims and their equivalents.

What is claimed is:

1. A graphics display system, comprising:

a graphics processing module, detecting whether first frame data is the same as second frame data subsequent to the first frame data, and outputting the second frame data and a mode switching command and stopping outputting any subsequent frame data, when the first frame data is the same as the second frame data; and a display module, displaying graphic images according to the first frame data, and in response to the mode switching command, storing the second frame data as temporary data, continuingly displaying the graphic images according to the temporary data, and continuously outputting a current vertical blank status to the graphics processing module;

wherein the mode switching command is delivered via an embedded DisplayPort (eDP) architecture auxiliary channel line, and the current vertical blank status is delivered via an eDP architecture Hot Plug Detect (HPD) signal line; or wherein the mode switching command is delivered via a Low-Voltage Differential Signaling (LVDS) architecture Serial DAta (SDA) line, and the current vertical blank status is delivered via an LVDS architecture Serial CLock (SCL) line.

2. The graphics display system of claim 1, wherein the graphics processing module further determines a synchronization time for the display module according to the current vertical blank status in response to detecting the second frame data not being the same as third frame data subsequent to the second frame data, and outputs the third frame data to the display module at the synchronization time, so that the display module displays the graphic images according to the third frame data.

3. The graphics display system of claim 1, wherein the graphics processing module further determines a synchronization time between the graphics processing module and the display module according to the current vertical blank status in response to the second frame data not being the same as the third frame data subsequent to the second frame data, and changes a voltage level on the SDA line and outputs the third frame data to the display module at the synchronization time, so that the display module displays the graphic images according to the third frame data in response to detecting the change of the voltage level on the SDA line, wherein the first, second, and third frame data are delivered via a data bus.

4. The graphics display system of claim 1, wherein the display module comprises a timing controller module, a display panel module, and a storage module, wherein the display module enters a power saving mode in response to the timing controller module receiving the mode switching command, and the timing controller module continuingly outputs a current vertical blank status of the display panel module to the graphics processing module in response to the display module being in the power saving mode, and stores the second frame data in the storage module as temporary data.

5. The graphics display system of claim 4, wherein the timing controller module further continuingly detects whether third frame data subsequent to the second frame data has been received during the time the display module stays in the power saving mode, and instructs the display module to leave the power saving mode and to stop displaying the graphic images according to the temporary data in response to the third frame data not being the same as to the second frame data.

6. A graphics display system, comprising:

a graphics processing module, detecting whether first frame data is the same as second frame data subsequent to the first frame data in a predetermined time period, and outputting the second frame data and a mode switching command and stopping outputting any subsequently frame data, when the first frame data is the same as the second frame data in the predetermined time period; and a display module, displaying at least one graphic image according to the first frame data, and in response to the mode switching command, storing the second frame data as temporary data, continuingly displaying the at least one graphic image according to the temporary data, and continuously outputting a current vertical blank status to the graphics processing module;

wherein the mode switching command is delivered via an embedded DisplayPort (eDP) architecture auxiliary channel line, and the current vertical blank status is delivered via an eDP architecture Hot Plug Detect (HPD) signal line; or wherein the mode switching command is delivered via a Low-Voltage Differential Signaling (LVDS) architecture Serial DAta (SDA) line, and the current vertical blank status is delivered via an LVDS architecture Serial CLock (SCL) line.

7. The graphics display system of claim 6, wherein the graphics processing module further determines a synchronization time for the display module according to the current vertical blank status in response to detecting the second frame data not being the same as the third frame data subsequent to the second frame data, and outputs the third frame data to the display module at the synchronization time, so that the display module displays the graphic images according to the third frame data.

8. The graphics display system of claim 6, wherein the graphics processing module further determines a synchronization time for the display module according to the current vertical blank status in response to the second frame data not being the same as third frame data subsequent to the second frame data, and changes a voltage level on the SDA line and outputs the third frame data to the display module at the synchronization time, so that the display module displays the graphic images according to the third frame data in response to detecting the change of the voltage level on the SDA line, wherein the first, second, and third frame data are delivered via a data bus.

9. The graphics display system of claim 6, wherein the display module comprises a timing controller module, a display panel module, and a storage module, wherein the display module enters a power saving mode in response to the timing controller module receiving the mode switching command, and the timing controller module continuingly outputs a current vertical blank status of the display panel module to the graphics processing module in response to the display module being in the power saving mode, and stores the second frame data in the storage module as temporary data.

10. The graphics display system of claim 9, wherein the timing controller module further continuingly detects whether third frame data subsequent to the second frame data has been received during the time the display module stays in the power saving mode, and instructs the display module to leave the power saving mode and to stop displaying the graphic images according to the temporary data in response to the third frame data not being the same as the second frame data.

11. A graphics display method for a graphics display system comprising a display module and a graphics processing module, comprising:

displaying, by the display module, graphic images according to first frame data received from the graphics processing module;

detecting, by the graphics processing module, whether a plurality of second frame data subsequent to the first frame data in a predetermined time period are all the same as the first frame data;

outputting, by the graphics processing module, the second frame data and a mode switching command to stop the display module from displaying the graphic images, when all of the plurality of the second frame data are the same as the first frame data;

storing, by the display module, the second frame data as temporary data in response to the mode switching command;

enabling the display module to continuingly display the graphic images according to the temporary data; and continuingly outputting, by the display module, a current vertical blank status to the graphics processing module in response to the mode switching command;

wherein the mode switching command is delivered via an embedded DisplayPort (eDP) architecture auxiliary channel line, and the current vertical blank status is delivered via an eDP architecture Hot Plug Detect (HPD) signal line; or wherein the mode switching command is delivered via a Low-Voltage Differential Signaling (LVDS) architecture Serial DAta (SDA) line, and the current vertical blank status is delivered via an LVDS architecture Serial CLock (SCL) line.

12. The graphics display method of claim 11, further comprising determining, by the graphics processing module, a synchronization time for the display module according to the current vertical blank status in response to detecting third frame data subsequent to the second frame data not being the same as the second frame data, and outputting, by the graphics processing module, the third frame data to the display module at the synchronization time, so that the display module displays the graphic images according to the third frame data.

13. The graphics display method of claim 11, further comprising determining, by the graphics processing module, a synchronization time for the display module according to a current vertical blank status in response to third frame data subsequent to the second frame data not being the same as the second frame data, and changing a voltage level on the SDA line and outputting the third frame data to the display module at the synchronization time by the graphics processing module, so that the display module continuingly displays the graphic images according to the third frame data in response to detecting the change of the voltage level on the SDA line, wherein the first, second, and third frame data are delivered via a data bus.

* * * * *